Figure 1:
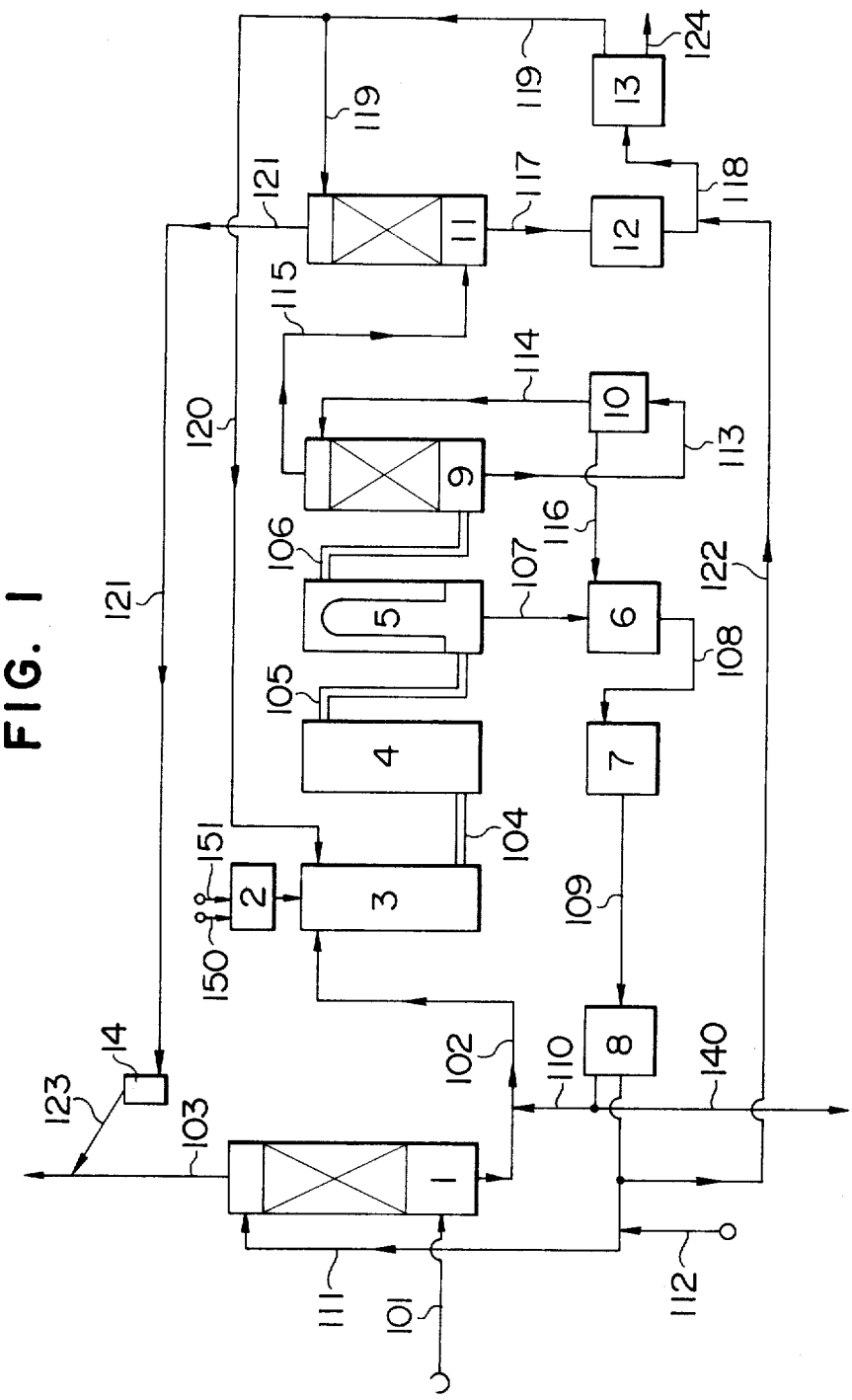

United States Patent [19]
Morita et al.

[11] 3,894,145
[45] July 8, 1975

[54] PROCESS FOR DESULFURIZATION OF WASTE GAS

[75] Inventors: Minoru Morita, Tokyo; Masuo Hasegawa, Kanagawa; Yasuhiko Kamijo, Saitama, all of Japan

[73] Assignee: Tsukishima Kikai Co., Ltd., Japan

[22] Filed: Sept. 18, 1973

[21] Appl. No.: 398,473

[52] U.S. Cl.................................. 423/567; 423/242
[51] Int. Cl................................................ C01b 17/04
[58] Field of Search .......... 423/207, 208, 242, 567, 423/574

[56] References Cited
UNITED STATES PATENTS

| | | | |
|---|---|---|---|
| 3,438,727 | 4/1969 | Heredy | 423/242 X |
| 3,533,748 | 10/1970 | Finfer et al. | 423/567 |
| 3,709,976 | 1/1973 | Tarhan | 423/574 |
| 3,719,742 | 3/1973 | Terrana | 423/242 |

Primary Examiner—G. O. Peters
Attorney, Agent, or Firm—Craig & Antonelli

[57] ABSTRACT

An improved process for desulfurization of waste gas emitted from, for example, various boilers. Five steps, namely, (1) the step of absorption of waste gas, (2) the step of pyrolysis, (3) the step of recovery and recycle of products, (4) the step of recovery of sulfur and (5) the step of recycle of by-products formed in the step (4), are included. As a further preferred embodiment, excesssive fuels are supplied in the step of pyrolysis (2) to generate a mixed gas, which is subjected to desulfurization in the step of removal of sulfur (4) and then utilized for heating the wet desulfurized gas coming out of the step of absorption (1). This process represents an improvement over the conventional process particularly in respect of the loss of alkali metals which can be minimized because they are recycled in the process.

15 Claims, 2 Drawing Figures

PROCESS FOR DESULFURIZATION OF WASTE GAS

This invention relates to an improved process for desulfurization of waste gases.

Waste gases out of heavy oil consuming boilers or boilers for generation of electric power contain sulfur oxides such as sulfur dioxide or anhydrous sulfuric acid gas, nitrogen oxides in the form of $NO_x$ and metal oxides included in fuel oils. That these waste gases are treated with an aqueous solution of alkali metal salts such as sodium carbonate or caustic soda is well known. One of the industrially applicable methods is to precipitate sulfite and bisulfite (hereinafter collectively referred to as "sulfites") formed into crystals or to make avail of the solution itself containing said sulfites. The other method is to convert sulfite into sodium bisulfite and decompose it into concentrated sulfur dioxide which is then recovered. The salts obtained according to the former method are recovered only to be thrown away on account of limited demande therefor. This results in a great loss of expensive alkali metals. On the other hand, in case of an aqueous solution, it must further be oxidized by air to reduce COD. Accordingly, the former method is applicable only under circumstances such that there is a factory in the neighborhood which utilizes a good deal of sulfite. The latter sodium sulfite method requires much amount of steam in decomposition. Highly concentrated sulfur dioxide exists in waste gas and it is difficult to reduce the concentration thereof to 150 ppm or less. In addition, removal of nitrogen oxides is also impossible by this method.

Furthermore, these methods of prior art as mentioned above involve a common drawback in that the waste gas after treatment contains a large amount of water and is low in temperature, resulting in insufficient diffusion into the air. For improvement of this disadvantage, the waste gas must be warmed by the use of expensive low sulfur fuels.

In other methods, such as Claus method wherein isolated sulfur is recovered from hydrogen sulfide or a method wherein organic redox agents are used in combination with alkaline solutions, a great loss of alkali metal is accompanied because alkali metal is oxidized as sulfur oxides together with organic redox agents when said redox agents are subjected to oxidative regeneration. Namely, the loss of alkali metal amounts to as much as about 75 to 300 kg (as sodium) per ton of recovered sulfur.

An object of the present invention is to provide a recycle system for preventing loss of alkali metal as much as possible.

The other object of the present invention is to provide a cheap process for improving the air diffusion property of the waste gas as mentioned above.

In order to accomplish the first object of the present invention, the present invention provides a a process for disulfurization of waste gas, comprising 1. the step of absorption wherein sulfur oxides contained in waste gas is absorbed by an aqueous alkali carbonate solution.

2. the step of pyrolysis wherein the absorbed aqueous solution is pyrolyzed under high temperature reducing conditions, 3. the step of recovery and recycle of products wherein alkali carbonate salts containing solid carbon in the pyrolyzed product formed in the said pyrolysis step 2 are recovered as solid content, then these salts are dissolved in a condensed water which is obtained by condensing the water in said pyrolized product and contains alkali sulfides or alkali hydrosulfides to prepare a solution, and after stabilizing by oxidation of the alkali sulfides or alkali hydrosulfides, the solution is recycled to the absorption step 1, 4. the step of recovery of sulfur wherein isolated sulfur is recovered from hydrogen sulfide contained in said pyrolyzed product, and 5. the step of recycle wherein polysulfides and sulfur oxides formed in the said step of recovery of sulfur step 4 are, recycled to the said step of pyrolysis 2.

In order to accomplish the second object as mentioned above, excessive fuels are supplied in the step of high temperature reducing pyrolysis (2) in the process for desulfurization of waste gas as mentioned above to generate a mixed gas, which gas after being subjected to desulfurization in the step of removal of sulfur (4), is utilized for heating the wet desulfurized gas coming out of the step of absorption (1).

The alkali mentioned in the present invention include sodium and potassium, but the following descriptions about the preferred embodiments of the present invention are restricted only to the cases where sodium is used as alkali.

Figure 2:
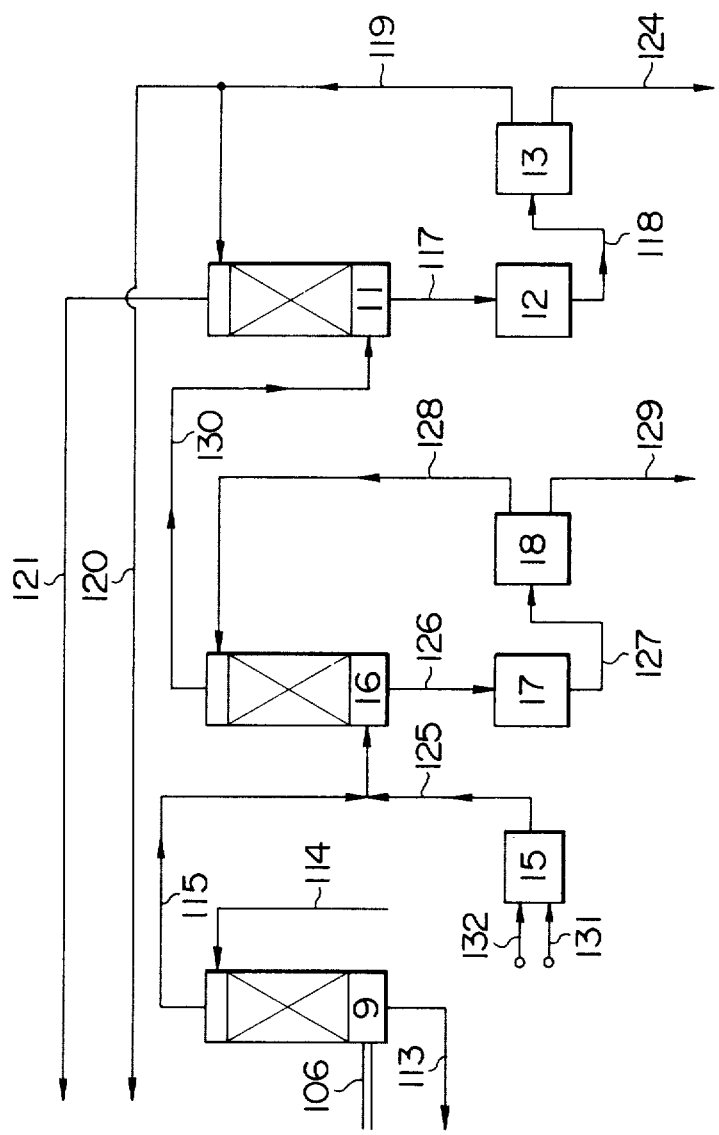

The present invention will now be illustrated more precisely by referring to the annexed drawings, in which, FIG. 1 is a flow sheet of desulfurization apparatus to illustrate one embodiment for practicing the present invention, and FIG. 2 is a schematic diagram of the step of recovery of sulfur, wherein wet Claus method is applied in the step of recovery of sulfur in the process of the present invention.

I. The step of absorption of waste gas

A waste gas containing sulfur oxides is introduced to the absorption tower 1 through the pipe 101 and brought into counter-current contact with an alkaline solution supplied from 111. 103 Is the vent gas outlet pipe and 102 the absorbed liquid outlet pipe.

As an alkaline solution, an aqueous sodium carbonate solution is used. This sodium carbonate contains sodium in substantial proportions recovered from the aforesaid absorbed liquid in the manner as described below. The content of sodium sulfide and sodium hydrosulfide should be 1.0 mol % or less in said solution. Otherwise, as $P_n$ decrease at the lower part of the absorption tower, hydrogen sulfide is generated and diffused into the air, so that the concentration of hydrogen sulfide in the vent gas is as much as 10 ppm or more. 112 Is the pipe for charging new alkali components.

The vent gas thus emitted is wet and therefore, poor in diffusion and so it is heated advantageously by the use of the desulfurized gas (containing a large amount of hydrocarbons without sulfur) as mentioned below. 14 Shows the furnace for combustion of desulfurized gas and 123 the passage of the gas coming out of said furnace.

II. The step of pyrolysis

The aqueous solution obtained in the above absorption step is transported to the high temperature reducing pyrolysis furnace 3 and pyrolyzed, for example, under known conditions, whereby sodium component is converted mainly to sodium carbonate and partially to sodium sulfate and sodium sulfide (solid), and sulfur component to hydrogen sulfide. 2 Shows the burning furnace, 150 the fuel pipe and 151 the air pipe.

A cheap, heavy oil with high sulfur content may also preferrably be used for this combustion, because the sulfur contained in heavy oil is converted during the pyrolysis step to hydrogen sulfide. This is extremely convenient for heating the vent gas out of the step of absorption of waste gas as mentioned above.

III. The step of recovering and circulating the solid components in the pyrolyzed product The gas coming out of the pyrolysis furnace 3 through the pipe 104 is recovered of its heat by the heat recovering furnace 4 and further through the pipe 105 reaches the solid component recovering unit 5. 107 Shows the solid component taking pipe and 106 the gas outlet pipe.

The solid component consists mainly of sodium carbonate, partially of sodium sulfate and sodium sulfide and further contains carbon. This is led to the dissolving tank 6 and the condensed water obtained by condensing the water contained in the pyrolyzed gas as described below is added thereto to dissolve the above alkali compounds.

As the condensed water contains sodium sulfide and sodium hydrosulfide as described below, the solution obtained is transported to the oxidation tank 7 through the pipe 108. As the oxidation method, oxidation by the air under atmospheric pressure is most economical.

Thus, sodium sulfide and sodium hydrosulfide are stabilized by being converted to polysulfide oxides (e.g., sodium thiosulfate). As mentioned above, if a solution containing sodium sulfide and sodium hydrosulfide in amounts exceeding a certain limit is used in the step 1 of absorption of waste gas, such inconveniences as generation by hydrogen sulfide are accompanied.

The aqueous solution after oxidation is taken out through the pipe 109, removed of carbon by the carbon filter 8 and thereafter transported to the absorption tower 1 through the pipe 111. A part of the solution is supplied as supplementary alkali components to the step of recovery of sulfur through the pipe 122. A part of carbon is recycled through the pipe 110 to the pyrolysis furnace 3. Since said carbon contains heavy metals such as chromium or vanadium, a part thereof is discharged out of the system through the pipe 140.

IV. The step of recovery of sulfur

The gas removed of solid components is transported to the step of recovery of sulfur through the pipe 106. If the hydrogen sulfide concentration is so high as, for example, 8,000 ppm or 20,000 ppm, wet recovery method is suitable.

Wet recovery methods may include Takahax method, Stretford method, Fumax method and the like wherein redox reactions are employed (for example, sodium carbonate solution containing organic redox agents, e.g., sodium 1,4-naphthoquinone-2-sulfonate, sodium anthraquinone disulfonate, picric acid or the like, is used to wash the gas to convert hydrogen sulfide to sodium hydrosulfide, which is then oxidized by the air to isolated sufur) and Claus method wherein sulfur dioxide and hydrogen sulfide are reacted in wet system to convert to isolated sulfur. Either method may be applicable in the process of the present invention.

First, the gas is introduced into the cooling tower 9 and is cooled at 40°C or lower. If the temperature exceeds 40°C, alkali sulfides are converted to polysulfide oxides when the organic redox agents as mentioned below are oxidized, resulting in the increase in amount of the waste liquid. 10 Shows the condenser, 113 and 114 are the condensed water taking pipe and the cooling medium supplying pipe, respectively. The condensed water is transported through the pipe 116 to the dissolving tank 6. This condensed water contains, other than sodium sulfide, sodium hydrosulfide and sodium bicarbonate formed by the reaction between hydrogen sulfide and traces of sodium carbonate.

The step of recovery of sulfur as represented in FIG. 1 is a system wherein redox reaction is used, while that of FIG. 2 is the system according to the Claus method.

A. System using redox reaction

The cooled gas out of the cooling tower 9 is transported through the pipe 115 to the absorption tower 11, where it is contacted with alkali solution containing organic redox agents. 117 Shows the absorbed liquid outlet pipe and 12 the oxidation tank, where hydrosulfides are converted to isolated sulfur and reduced organic redox agents are oxidized.

The isolated sulfur is transported through the pipe 118 to the filter 13 and taken out from 124. The filtrate is recycled in part via the pipe 119 to the absorption tower 11 and transported in part through the pipe 120 to the pyrolysis furnace 3. This is done for the purpose of recovery of alkali by pyrolysis of the alkali sulfur oxides, such as sodium thiosulfate, sodium sulfate, etc., which are by-produced in the oxidation at 12 as mentioned above. The supplementary charge of alkali components corresponding in amount to those taken out is conducted through the pipe 122.

On the other hand, desulfurized waste gas rich in hydrocarbons leaving the absorption tower 11, is through the pipe 121 transported to the combustion furnace 14, wherein it is burned to heat the vent gas from the waste gas absorption unit 1 as described above.

B. Claus method

According to this method, the procedure of the method A after leaving the cooling tower 9 onward is slightly modified. Namely, sulfur 132 and air 131 are supplied into the sulfur combustion furnace 15 to generate sulfur dioxide, which is led by the pipe 125 to be mixed with the cooling gas led by the pipe 115 to form sulfur in the reaction tower 16. The isolated sulfur enters through the pipe 126 into the receiving tank 17 and further through the pipe 127 into the filter 18, where it is separated out of the system through the pipe 129, while the filtrate is recycled through the pipe 128 to the reaction tower 16. The approximately desulfurized gas is led by the pipe 130 into the absorption tower 11, where sulfur is separated from the unrecovered hydrogen sulfide in the same manner as described in method A.

EXAMPLE 1

A waste gas from a heavy oil boiler was treated in the manner as shown in FIG. 1. The boiler waste gas of a temperature of 140°C having the composition as shown in Table 1 is charged into the absorption tower 1 at the rate of 1000 Nm³/hour and treated with an aqueous sodium carbonate solution.

Table 1

| | | |
|---|---|---|
| $SO_2$ | 0.18 % | (by volume) |
| $CO_2$ | 12.9 | " |
| $O_2$ | 2.60 | " |
| $N_2$ | 74.04 | " |
| $H_2O$ | 11.09 | " |

The aqueous sodium carbonate solution used had the composition as shown in Table 9 and it is used at the rate of 45.7 Kg/hour. The absorbed liquid in the pipe 102 leaving the absorption tower 1 had the composition as shown in Table 2 and its flow rate was 47.3 Kg/hour.

Table 2

| | | |
|---|---|---|
| $Na_2S_2O_3$ | 1.00 % | (by weight) |
| $Na_2SO_4$ | 4.50 | " |
| $Na_2SO_3$ | 8.25 | " |
| $NaHSO_3$ | 8.25 | " |
| $H_2O$ | 78.00 | " |

On the other hand, the waste liquid in the pipe 120 out of the step of recovery of sulfur had the composition as shown in Table 3 and its flow rate was 20.0 Kg/hour.

Table 3

| | | |
|---|---|---|
| $Na_2CO_3$ | 1.29 % | (by weight) |
| $Na_2S_2O_3$ | 15.32 | " |
| $Na_2SO_4$ | 8.99 | " |
| $NaHCO_3$ | 2.72 | " |
| $H_2O$ | 71.68 | " |

The absorbed liquid in the pipe 102 leaving the absorption tower 1 and having the composition as shown in the above Table 2 and the waste liquid in the pipe 120 leaving the step of recovery of sulfur and having the composition as shown in the above Table 3 were sprayed into the pyrolysis furnace 3 at the rate of 47.3 Kg/hour and 20.0 Kg/hour, respectively. The gas temperature was maintained at 850°C in the pyrolysis furnace and pyrolysis was effected for 4 seconds. A heavy oil having the composition as shown in Table 4 was charged as fuel into the furnace at the rate of 12.49 Kg/hour and the air for combustion was supplied at 25°C at the rate of 91.8 Nm³/hour. As the result, the solid product having the composition as shown in Table 5 was obtained at the rate of 12.7 Kg/hour and the pyrolyzed gas having the composition as shown in Table 6 was obtained at the rate of 179.5 Nm³/hour.

Table 4

| | | |
|---|---|---|
| C | 84.5 % | (by weight) |
| H | 11.9 | " |
| S | 3.0 | " |
| $H_2O$ | 0.5 | " |
| Ash content | 0.1 | " |

Table 5

| | | |
|---|---|---|
| $Na_2CO_3$ | 70.13 % | (by weight) |
| $Na_2SO_4$ | 14.29 | " |
| $Na_2S$ | 5.49 | " |
| C | 10.09 | " |

Table 6

| | | |
|---|---|---|
| $CO_2$ | 9.0 % | (by weight) |
| $N_2$ | 39.5 | " |
| $CH_4$ | 0.13 | " |
| CO | 0.54 | " |
| $H_2S$ | 1.63 | " |
| $H_2$ | 2.99 | " |
| $H_2O$ | 46.23 | " |

The above reaction product were solid granules of 5 to 10 μ in size. The solid reaction product and the gas were cooled to 250°C in the heat recovering furnace 4, whereby steam with a pressure of 10 Kg/cm² was recovered at the rate of 144 Kg/hour from said heat recovering furnace. The cooled solid and the gas were separated from each other in the solid recovering device. The efficiency of separation of the solid was 98 %.

The gas thus separated from the solid was cooled to 40°C in the cooling tower 9. As a cooling medium, water with a temperature of 25°C was used at the rate of 3.6 Ton/hour. In this cooling tower 9, water contained in the gas was condensed at the rate of 61.6 Kg/hour. Said condensed water contained solid components not recovered in the solid recovering device at the rate of 0.26 Kg/hour. This condensed water was utilized for dissolving the solid recovered in the dissolving tank 6, whereby the solution having the composition as shown in Table 7 was obtained at the rate of 74.3 Kg/hour. When this solution was oxidized under atmospheric pressure by the air stream of 3.27 Nm³/hour for 30 minutes in order to convert sodium sulfide and sodium hydrosulfide contained therein to sodium thiosulfate, the solution obtained had the composition as shown in Table 8.

Table 7

| | | |
|---|---|---|
| $Na_2CO_3$ | 11.8 % | (by weight) |
| $Na_2SO_4$ | 2.44 | " |
| $NaHCO_3$ | 0.095 | " |
| $NaSH + Na_2S$ | 0.993 | " |
| NaOH | 0.01 | " |
| C | 1.72 | " |
| $H_2O$ | 82.95 | " |

Table 8

| | | |
|---|---|---|
| $Na_2CO_3$ | 11.8 % | (by weight) |
| $Na_2SO_4$ | 2.42 | " |
| $NaHCO_3$ | 0.094 | " |
| $Na_2S_2O_3$ | 1.03 | " |
| NaOH | 0.478 | " |
| C | 1.71 | " |
| $H_2O$ | 82.5 | " |

The oxidized alkaline solution was filtered to remove carbon therefrom. Carbon with liquid content of 30 % was obtained at the rate of 4.26 Kg/hour. The filtrate after removal of the carbon had the composition as shown in Table 9. An aqueous 48 % caustic soda solution was added to this solution as supplementary charge for lost alkali at the rate of 0.72 Kg/hour. This solution was supplied for desulfurization of sulfur dioxide in boiler waste gas at the rate of 45.7 Kg/hour and as a supplementary alkali solution for the sulfur recovering unit at the rate of 25.5 Kg/hour, respectively.

Table 9

| | | |
|---|---|---|
| $Na_2CO_3$ | 11.86 % | (by weight) |
| $Na_2S_2O_3$ | 1.04 | " |
| $Na_2SO_4$ | 2.44 | " |
| $NaHCO_3$ | 0.09 | " |
| $NaOH$ | 0.96 | " |
| $H_2O$ | 83.60 | " |

Table 10

| | | |
|---|---|---|
| $CO_2$ | 15.72 % | (by volume) |
| $N_2$ | 68.94 | " |
| $CH_4$ | 0.23 | " |
| $CO$ | 0.94 | " |
| $H_2S$ | 2.84 | " |
| $H_2$ | 5.21 | " |
| $H_2O$ | 6.12 | " |

On the other hand, the reaction product gas, which had been cooled to 40°C and had the composition as shown in Table 10, was supplied to the absorption tower 11 at the rate of 103 Nm³/hour for desulfurization. As a redox agent, sodium 1,4-naphthoquinone-2-sulfonate was used. As a result, the waste liquid having the composition as shown in Table 3 was drained out of the system at the rate of 20.0 Kg/hour and purified sulfur with 99 % purity was obtained at the rate of 2.79 Kg/hour. The gas from which hydrogen sulfide was removed had the composition as shown in Table 11 and its genuine heat content was 188 Kcal/Nm³. The heat content of this gas was utilizable for heating of the vent gas from the absorption tower 1.

Table 11

| | | |
|---|---|---|
| $CO_2$ | 16.18 % | (by volume) |
| $N_2$ | 70.95 | " |
| $CH_4$ | 0.24 | " |
| $CO$ | 0.97 | " |
| $H_2$ | 5.37 | " |
| $H_2O$ | 6.30 | " |

In the above Example, the amount of the supply of caustic soda (100 % NaOH) as supplementary alkali charge was 124 Kg per ton of recovered sulfur (99 % purity), while in the conventional method wherein no circulation of alkali is adopted, caustic soda was supplied in amount of 500 Kg per ton of recovered sulfur.

EXAMPLE 2

The waste gas from a boiler with a temperature of 140°C having the composition as shown in Table 1 was treated in the manner as shown in FIG. 2.

The gas having the composition as shown in Table 10 which had been cooled to 40°C in the cooling tower 9 was supplied at the rate of 71.0 Nm³/hour together with sulfur dioxide at the rate of 1.04 Kg/hour into the reaction tower 16. In the reaction tower, wet Claus reaction was carried out by the use of an organic absorbent(M.W.=380~420; Specific gravity=1.125;M.P.=4°~8°C; vapor pressure: $9.0 \times 10^{-5}$ mm Hg at 100°C, $1.0 \times 10^{-3}$ mm Hg at 130°C) containing catalyst. Isolated sulfur with purity of 99.5 % was recovered at the rate of 3.12 Kg/hour. The gas leaving the reaction tower was introduced into the absorption tower 11, wherein desulfurization was effected with sodium carbonate solution by using sodium 1,4-naphthoquinone-2-sulfonate as a redox agent. Isolated sulfur with purity of 99 % was recovered at the rate of 1.06 Kg/hour. The waste liquid was drained out of the system at the rate of 3.2 kg/hour. According to this method, the amount of caustic soda (100 % NaOH) as supplementary alkali was 124 Kg per ton of recovered sulfur, equally as compared with the method as shown in FIG. 1, but the amount of loss of the redox agent (sodium 1,4-naphthoquinone-2-sulfonate) was reduced extremely. Namely, the loss of said redox agent was 29.3 g/hour in Example 1, while that of Example 2 was 4.7 g/hour.

We claim:

1. A process for the desulfurization of a waste gas comprising:

1. absorbing sulfur oxides contained in said waste gas with an aqueous alkali carbonate solution to form an aqueous solution containing sodium or potassium sulfite and sodium or potassium bisulfite and a desulfurized vent gas,
  2. pyrolyzing said solution containing sodium or potassium sulfite and sodium or potassium bisulfite to form a pyrolysis gas product containing hydrogen sulfide and water and a pyrolysis solid product containing sodium or potassium carbonate and carbon,
  3. condensing water contained in said pyrolyzed gas product to produce a condensed water solution containing at least one sulfide or hydrosulfide of sodium or potassium,
  4. mixing said pyrolysis solid product with said condensed water solution whereby salts in said pyrolysis solid product are dissolved in said condensed water solution,
  5. oxidizing said at least one sulfide or hydrosulfide of sodium or potassium in said condensed water solution,
  6. recycling the condensed water solution containing the oxidized sulfide or hydrosulfide to absorption step 1,
  7. recovering sulfur in elemental form from the hydrogen sulfide in said pyrolyzed gas product so as to produce a liquid residue containing sodium or potassium sulfur oxides and a desulfurized waste gas, and
  8. recycling at least a portion of said liquid residue to pyrolysis step 2.

2. The process of claim 1, wherein pyrolysis is accomplished by the combustion of a heavy oil in such a way that said pyrolysis gas product contains combustable gas components whereby said desulfurized waste gas contains combustable gas components, said process further comprising combusting the combustable gas components in said desulfurized waste gas to produce heat and utilizing the heat so produced to heat said vent gas.

3. The process of claim 1, wherein said pyrolysis solid product contains sodium or potassium carbonate, sodium or potassium sulfate, sodium or potassium sulfide, and carbon.

4. The process of claim 3, wherein said pyrolysis gas product contains carbon dioxide, nitrogen, methane, carbon monoxide, hydrogen sulfide, hydrogen and water.

5. The process of claim 1, wherein said pyrolysis gas product contains carbon dioxide, nitrogen, methane, carbon monoxide, hydrogen sulfide, hydrogen and water.

6. The process of claim 1, further comprising removing carbon contained in said condensed water solution.

7. The process of claim 6, wherein carbon is removed by filtration after oxidation of the at least one sulfide or hydrosulfide in said condensed water solution.

8. The process of claim 1, wherein the at least one sulfide or hydrosulfide in said condensed water solution is oxidized to polysulfide oxides.

9. The process of claim 8, wherein said at least one sulfide or hydrosulfide is oxidized to sodium or potassium thiosulfate.

10. The process of claim 8, wherein said condensed water solution after oxidation contains sodium or potassium carbonate, sodium or potassium sulfate, sodium or potassium bicarbonate, sodium or potassium thiosulfite, sodium or potassium hydroxide, carbon and water.

11. The process of claim 1, wherein a proportion of said condensed water solution after oxidation of the at least one sulfide or hydrosulfide therein is used in the recovery of sulfur in elemental form.

12. The process of claim 1, wherein sulfur is recovered in elemental form by means of a redox reaction using organic redox agents.

13. The process of claim 1, wherein sulfur is recovered by means of the Claus method.

14. The process of claim 1, wherein the aqueous solution of step 1 contains sodium sulfite and sodium bisulfite.

15. The process of claim 1, wherein the solution of step 1 contains potassium sulfite and potassium bisulfite.

* * * * *